United States Patent
Singh et al.

(10) Patent No.: US 12,483,403 B2
(45) Date of Patent: Nov. 25, 2025

(54) INTELLIGENT METHOD TO ORCHESTRATE TRANSACTIONS ON SPATIAL COMPUTING INTERNET-OF-THINGS ("IoT") DEVICE ON FACIAL TRUST ANCHORS AND PASSKEY

(71) Applicant: Bank of America Corporation, Charlotte, NC (US)

(72) Inventors: Shailendra Singh, Maharashtra (IN); Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 138 days.

(21) Appl. No.: 18/626,401

(22) Filed: Apr. 4, 2024

(65) Prior Publication Data

US 2025/0317288 A1    Oct. 9, 2025

(51) Int. Cl.
*H04L 9/14*    (2006.01)
*G06F 21/32*    (2013.01)

(52) U.S. Cl.
CPC ............... *H04L 9/14* (2013.01); *G06F 21/32* (2013.01)

(58) Field of Classification Search
None
See application file for complete search history.

(56) References Cited

U.S. PATENT DOCUMENTS

| | | | |
|---|---|---|---|
| 9,865,089 B2 * | 1/2018 | Burns | G02B 27/017 |
| 10,509,533 B2 * | 12/2019 | Grasset | G06T 19/006 |
| 11,538,213 B2 * | 12/2022 | Rowley | H04N 21/8545 |
| 2002/0120866 A1 * | 8/2002 | Mitchell | H04L 63/20 726/4 |
| 2002/0194003 A1 * | 12/2002 | Mozer | G10L 17/00 704/270.1 |
| 2022/0014376 A1 * | 1/2022 | Bae | H04W 12/47 |
| 2022/0066545 A1 * | 3/2022 | Zhuo | G06N 3/0464 |

FOREIGN PATENT DOCUMENTS

EP    3373554 B1 *    11/2022    .......... H04W 12/069

* cited by examiner

*Primary Examiner* — Piotr Poltorak
(74) *Attorney, Agent, or Firm* — Weiss & Arons LLP

(57) ABSTRACT

Method and apparatus for processing and executing a user transaction using a spatial computing Internet-of-Things ("IoT") device. The method and apparatus may include generating a map from mapping an environment surrounding the spatial computing IoT device. The method and apparatus may include identifying an image of a face on the map. The method and apparatus may include retrieving user identifier information ("UII") of the face. The method and apparatus may include storing UII in pixels on the face. The method and apparatus may include using UII as a public key. The method and apparatus may include using trust score colors as a private key. The method and apparatus may include executing, using the private key and the public key as a dynamic passkey, a transaction requested by a user associated with the spatial computing IoT device. The transaction may be associated with the user associated with the identified face.

20 Claims, 7 Drawing Sheets

INTELLIGENT METHOD TO ORCHESTRATE TRANSACTIONS ON SPATIAL COMPUTING INTERNET-OF-THINGS ("IoT") DEVICE ON FACIAL TRUST ANCHORS AND PASSKEY

FIELD OF TECHNOLOGY

Aspects of the disclosure relate to securely orchestrating transactions using a spatial computing Internet-of-Things ("IoT") device based on facial trust anchors and passkeys.

BACKGROUND OF THE DISCLOSURE

Spatial computing devices introduce security concerns, particularly in the realms of payments, transactions, and password protection.

Vulnerabilities in transactions involving spatial computing devices, such as artificial reality ("AR") glasses and virtual reality ("VR") headsets, may lack robust security features commonly found in traditional devices. The integration of transaction functionalities within these devices introduces potential vulnerabilities that could compromise financial transactions. Unauthorized access, data interception, and identity theft are among the risks associated with the insecure handling of transaction information on spatial computing platforms.

Password security challenges exist for traditional password entries. Therefore, traditional password entry methods may be inadequate in the spatial computing landscape. Further, gesture-based, or voice-activated password inputs, common in these devices, may be susceptible to unintended access. Ambient environmental factors, like background noise or visual distractions, may inadvertently trigger authentication mechanisms, raising concerns about the reliability and integrity of password protection in spatial computing environments.

There exists a lack of standardized security protocols in the spatial computing space. The rapid evolution of spatial computing technology has outpaced the establishment of standardized security protocols. Inconsistencies in security measures across different devices and platforms pose challenges for creating a unified and secure environment. This lack of standardization further amplifies the risk of unauthorized access and data breaches, impacting the confidentiality and integrity of payments, transactions, and password information.

Therefore, it would be desirable to develop mitigation strategies to improve security in spatial computing. Addressing the security challenges associated with spatial computing, however, devices require a multi-faceted approach. Developers, manufacturers, and regulatory bodies must collaborate to establish industry-wide security standards.

It would therefore be desirable to develop apparatus and methods for increasing security in spatial computing based on facial trust anchors and passkeys.

SUMMARY OF THE DISCLOSURE

Apparatus and methods to securely orchestrate transactions on spatial computing IoT devices based on facial trust anchors and passkeys are provided. The apparatus and methods may enable seamless transactions for users of spatial computing devices based on facial trust anchors and passkeys.

Apparatus and methods for a spatial computing IoT device may include a light detection and ranging ("LiDAR") analyzer. The terms "spatial computing IoT device," "spatial computing device," and "spatial IoT device" may be used interchangeably herein. A spatial computing device may be, e.g., an AR headset or device, VR headset or device, or other spatial computing headset or device. The LiDAR analyzer may form part of the spatial computing IoT device. The LiDAR analyzer may be distinct from the spatial computing IoT device. A user may wear a spatial computing IoT device when scanning an environment. As such, the spatial computing IoT device may be associated with the user.

A spatial computing IoT device may be associated with an environment surrounding the spatial computing IoT device. For purposes of this application, an environment may be understood to mean a predetermined physical area surrounding the user. The environment surrounding the user may be equipped with one or more spatial computing IoT devices. As such, the spatial computing IoT devices may be in any other suitable location surrounding the user. Examples of locations for an environment-based spatial computing IoT device may include a top of an electric pole and a corner of a room. Each of a plurality of spatial computing IoT devices may include at least one LiDAR analyzer.

Each spatial computing IoT device, whether associated with a user, or associated with an environment surrounding the spatial computing IoT device, may use one or more LiDAR analyzers to map the environment surrounding the spatial computing IoT device.

LiDAR technology is a depth recognizing system using laser lights. A LiDAR analyzer may create a map of a physical environment surrounding the spatial computing IoT device. The map may be generated with respect to the user. As such, the user may be located centrally within the map. The map may include one or more objects and anchors in the spatial environment. The LiDAR analyzer may convert the map into a video.

The video may include the captured map. The video may not include the captured map. The video may capture an actual transaction performed by the user. The video may capture a location in which the user was situated.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
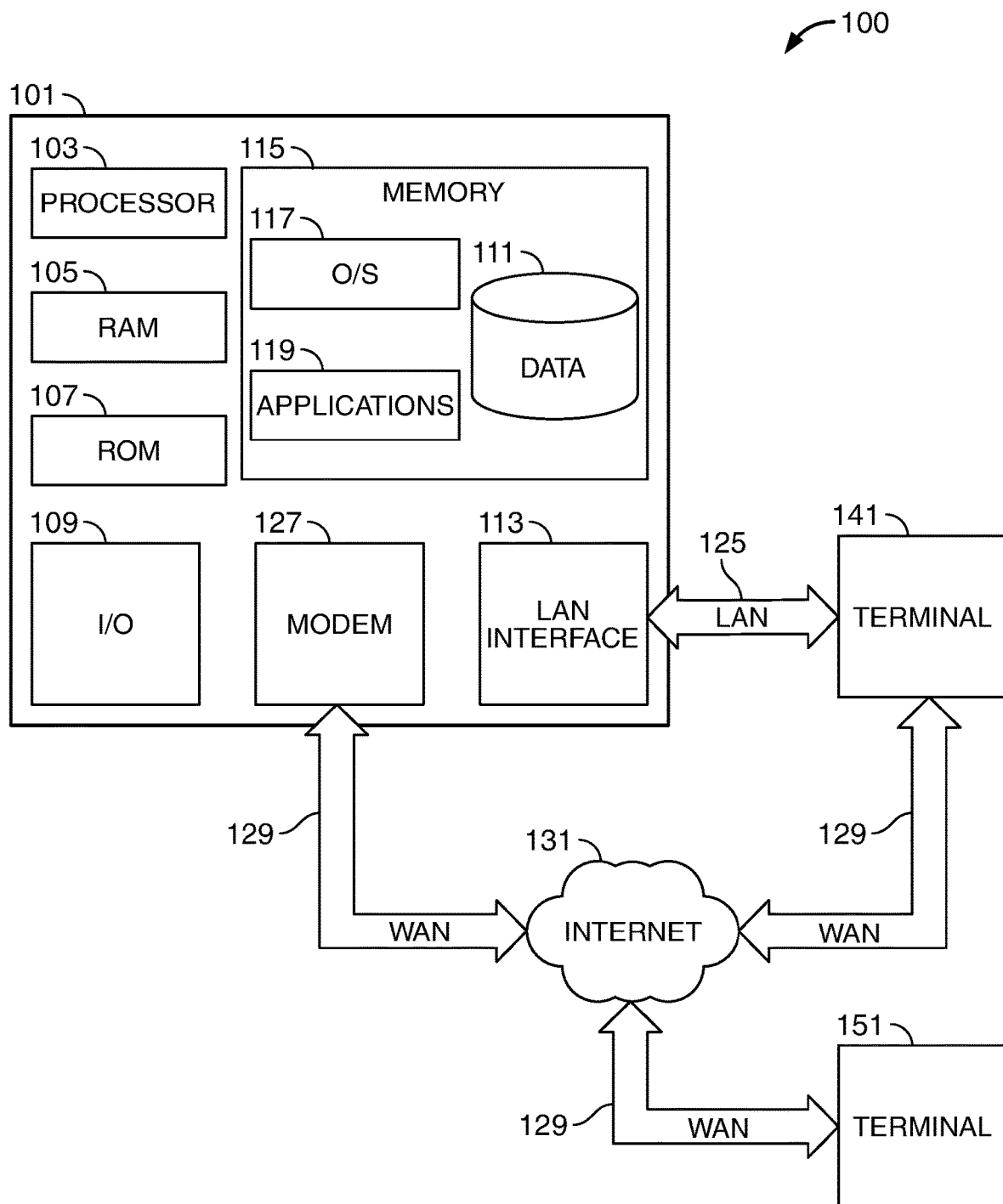
FIG. 1 shows an illustrative system in accordance with principles of the disclosure.

Apparatus and methods are provided to orchestrate transactions on spatial computing IoT devices based on facial trust anchors and passkeys. The apparatus and methods may enable seamless transactions for users of spatial computing devices based on facial trust anchors and passkeys.

Apparatus and methods may leverage spatial computing devices to facilitate seamless transactions by introducing a trust-based passkey system generated through facial biometric scores. This disclosure aims to streamline transactions by combining spatial computing and facial biometric technology to generate trust-based passkeys for seamless orchestration of transactions. Spatial IoT devices may capture and analyze their surrounding physical environments, allowing for precise user identification and interaction.

Apparatus and methods may enable advanced algorithms for financial institutions that may analyze user information and facial features, creating biometric scores serving as trust metrics for genuine users. Apparatus and methods may break a user image into a pixel-based grid, where each pixel may represent user information (e.g., account number, balance, past transaction fraud score, past fraud score, past credit score, etc.).

Apparatus and methods may convert the user information into different colors and color the image of the user in front of a facial device. The default mode may represent a lack of user trust by, e.g., red pixels and a low facial score. In this example, a face in front of a spatial IoT device having red pixel zones and a low facial score may represent a risky transaction.

Upon successful facial biometric authentication, the system may generate a trust-based passkey (e.g., a private-public key pair). This passkey may serve as a dynamic token, specifically tied to a user's biometric score and spatial context. The passkey may establish a secure and reliable link between users and their spatial computing devices. A color-coded biometric image may serve as a private key of the passkey and encrypted information may serve as a public key of the passkey.

Users may seamlessly orchestrate transactions by leveraging their trust-based passkeys. The system may prioritize user trust by providing transparency in the authentication process. Users may be informed about the generation of trust-based passkeys and may monitor their biometric scores to ensure the system's accuracy and reliability.

Methods and apparatus may include architecture and key components including, e.g.: (1) a spatial computing device enrollment engine; (2) a spatial view analyzer; (3) a face identification engine; (4) a transaction initiation engine; (5) a facial trust score calculator engine; (6) a public and private key generation engine; (7) a passkey generation engine; (8) a key and trust score broadcasting engine; (9) an authentication engine; (10) and a transaction orchestration engine.

The apparatus and methods may include a spatial computing device enrollment engine. The spatial computing device enrollment engine may be used to enroll data obtained from spatial computing devices and financial institutions for transactions.

The apparatus and methods may also include a spatial view analyzer. The spatial view analyzer may be used to make a spatial view of a surrounding environment.

The apparatus and methods may include a face identification engine. The face identification engine may be used to provide facial attribute information.

The apparatus and methods may include a transaction initiation engine. The transaction initiation engine may be used to integrate with a financial institution for private and public key information fetching. The transaction initiation engine may also be used to provide user account and past credit information.

The apparatus and methods may include a facial trust score calculator engine. The face trust score calculator engine may be used to provide trust scores to the spatial computing device enrollment engine.

The apparatus and methods may include a public and private key generation engine. The public and private key generation engine may be used to generate public and private keys. Resources may be exchanged between the spatial computing device enrollment engine and the public and private key generation engine. The public and private key generation engine may also be used to reverify information with the financial institution.

The apparatus and methods may include a passkey generation engine. The passkey generation engine may be used to generate a passkey from the public and private keys. Passkeys may be used to enable transactions between primary users and secondary users. A primary user may be a user orchestrating a transaction. A secondary user may be a non-orchestrating user associated with the transaction. Passkeys may also be used to enable transactions between one or more secondary users and one or more other secondary users. In some embodiments, the transactions may be orchestrated by a primary user.

The apparatus and methods may include a key and trust score broadcasting engine. The key and trust score broadcasting engine may be used to broadcast trust score information to users in a spatial session via the spatial computing device enrollment engine.

The apparatus and methods may include an authentication engine. The authentication engine may be used to verify each user prior to final transaction approval. The authentication engine may exchange information with the spatial computing device enrolment engine. The apparatus and methods may include a transaction orchestration engine. The transaction orchestration may be used to provide final approval for each transaction.

Methods for processing and executing transactions using a spatial computing IoT device are provided. The methods may include generating a map from mapping, using a LiDAR analyzer, an environment surrounding a spatial computing IoT device.

The methods may include scanning the map by using a facial biometric scanner. The facial biometric scanner may be a part of the spatial computing IoT device. The methods may include identifying, from the scanning, an image of a face included in the map. The methods may include retrieving, from the scanning, UII of the identified face.

The methods may include dividing the image of the identified face into a plurality of pixels. The methods may include storing the UII in the pixels. One discrete bit of the UII may be stored in each pixel. A bit of UII may be one piece, string, or unit of UI. The methods may include encrypting the UII into an encrypted UII algorithm, the encrypted UII algorithm stored as a public key.

The methods may include transmitting, via an institution integration module located in the spatial computing IoT device, the encrypted UII algorithm to an entity computing system. The methods may include decoding, at the spatial computing IoT device, the encrypted UII algorithm into numbers. The numbers may correspond to colors.

The methods may include arranging each color over a discrete one of the plurality of pixels. The methods may include overlaying each color over each discrete pixel. The methods may include encrypting the overlayed colors into an encrypted facial biometric algorithm. The encrypted facial biometric algorithm may be stored as a private key.

The methods may include converting the private key into a user trust score. The user trust score may correspond the identified face. The methods may include verifying, by a threshold trust score, the authenticity of a user associated with the identified face. The verifying may be based upon the user trust score.

The methods may include executing a transaction requested by a user associated with the spatial computing IoT device. The transaction may be associated with the user associated with the identified face. The executing may use the private key and the public key as a dynamic passkey for the transaction.

The methods may include identifying, from the scanning, images of a plurality of faces included in the map. The methods may include retrieving, from the scanning, UII for each of the plurality of identified faces. The methods may include dividing the images of the plurality of identified faces into a plurality of pixels. The methods may include storing the UII in the pixels. One discrete bit of the UII may be stored in each pixel. A bit of UII may be one piece, string, or unit of UII.

The methods may include encrypting the UII into encrypted UII algorithms. The encrypted UII algorithms may be stored as public keys. The methods may include transmitting, via an institution integration module located in the spatial computing IoT device, the encrypted UII algorithms to an entity computing system.

The methods may include decoding, at the spatial computing IoT device, the public keys into a plurality of numbers. The plurality of numbers may correspond to a plurality of colors. The methods may include arranging each color over a discrete one of the plurality of pixels. The methods may include overlaying each color over each discrete pixel. The methods may include encrypting the overlayed colors into encrypted facial biometric algorithms. The encrypted facial biometric algorithms may be stored as private keys.

The methods may include converting the private keys into user trust scores. The user trust scores may correspond to the UII for the plurality of identified faces. The methods may include verifying, by a threshold trust score, the authenticities of users associated with the plurality of identified faces. The verifying may be based upon the user trust scores. The methods may include executing transactions requested by a user associated with the spatial computing IoT device. The transactions may be associated with the users associated with the identified faces. The executing may use the private keys and the public keys as dynamic passkeys for the transactions.

The methods may include a threshold trust score within a range between 0.8-1. The methods may include a threshold trust score of 0.9. The methods may include a threshold trust score of 0.95. A threshold trust score of 1 may be considered complete trust (i.e., zero transactional friction). Complete trust may allow for all transactions. A threshold trust score of 0 may be considered zero trust (i.e., complete transactional friction). Zero trust may disallow all transactions.

The methods may include a spatial computing IoT device associated with an entity computing system. The methods may include a LiDAR analyzer forming part of the spatial IoT computing device.

The methods may include grouping the UII into agglomerations based on an IP address of a last user transaction. The methods may include basing the public key on the agglomerations.

An apparatus for processing and executing a user transaction using a spatial computing IoT device is provided. The apparatus may include a spatial computing IoT device. The apparatus may include a LiDAR analyzer. The LiDAR analyzer may be configured to generate a map from mapping an environment surrounding the spatial computing IoT device.

The spatial computing IoT device may be configured to scan the map by using a facial biometric scanner, the facial biometric scanner being a part of the spatial computing IoT device. The spatial computing IoT device may be configured to identify, from the scan, an image of a face included in the map.

The spatial computing IoT device may be configured to retrieve, from the scan, UII of the identified face. The spatial computing IoT device may be configured to divide the image of the identified face into a plurality of pixels. The spatial computing IoT device may be configured to store the UJI in the pixels. One discrete bit of the UJI may be stored in each pixel.

The spatial computing IoT device may be configured to encrypt the UII into an encrypted UII algorithm. The encrypted UII algorithm may be stored as a public key.

The spatial computing IoT device may be configured to transmit, via an institution integration module located in the spatial computing IoT device, the encrypted UII algorithm to an entity computing system. The spatial computing IoT device may be configured to decode, at the spatial computing IoT device, the public key into a plurality of numbers. Each number in the plurality of the numbers may correspond to a color included in a plurality of colors.

The spatial computing IoT device may be configured to arrange each color over a discrete one of the plurality of pixels. The spatial computing IoT device may be configured to overlay each color over each discrete pixel.

The spatial computing IoT device may be configured to encrypt the colors into an encrypted facial biometric algorithm. The encrypted facial biometric algorithm stored as a private key.

The spatial computing IoT device may be configured to convert the private key into a trust score. The trust score may correspond to UII for the identified face.

The spatial computing IoT device may be configured to verify, by a threshold trust score, the authenticity of a user associated with the identified face, said verifying being based upon the trust score of the user. The spatial computing IoT device may be configured to execute a transaction requested by a user associated with the spatial computing IoT device. The transaction may be associated with the user associated with the identified face. The executing may use the private key and the public key as a dynamic passkey for the transaction.

The spatial computing IoT device may be configured to identify, from the scanning, images of a plurality of faces included in the map. The spatial computing IoT device may be configured to retrieve, from the scanning, UII of the plurality of identified faces.

The spatial computing IoT device may be configured to divide the images of the plurality of identified faces into a plurality of pixels. The spatial computing IoT device may be configured to store the UII in the pixels. One discrete bit of the UII may be stored in each pixel.

The spatial computing IoT device may be configured to encrypt the UII into encrypted UII algorithms. The encrypted UII algorithms may be stored as public keys. The spatial computing IoT device may be configured to transmit, via an institution integration module located in the spatial computing IoT device, the encrypted UII algorithms to an entity computing system.

The spatial computing IoT device may be configured to decode, at the spatial computing IoT device, the public key into a plurality of numbers. Each number in the plurality of the numbers may correspond to a color included in a plurality of colors.

The spatial computing IoT device may be configured to arrange each color over a discrete one of the plurality of pixels. The spatial computing IoT device may be configured to overlay each color over each discrete pixel.

The spatial computing IoT device may be configured to encrypt the overlayed colors into encrypted facial biometric algorithms. The encrypted facial biometric algorithms may be stored as private keys. The spatial computing IoT device may be configured to convert the encrypted facial biometric algorithms into user trust scores. The user trust scores may correspond to the UJI for the plurality of identified faces.

The spatial computing IoT device may be configured to verify, by a threshold trust score, the authenticities of users associated with the plurality of identified faces. The verifying may be based upon the user trust scores. The spatial computing IoT device may be configured to execute, when the users are authenticated based on the user trust scores, transactions requested by a user associated with the spatial computing IoT device, by using the private keys and the public keys as dynamic passkeys for the transactions.

The spatial computing IoT device may be configured with a threshold trust score within a range between 0.8-1. The spatial computing IoT device may be configured with a threshold trust score of 0.9. The spatial computing IoT device may be configured with a threshold trust score of 0.95. In such a case, only users with trust scores above 0.95 may be able to transact. A threshold trust score of 1 may be considered complete trust (i.e., zero transactional friction) and all transactions may be allowed. A threshold trust score of 0 may be considered zero trust (i.e., complete transactional friction) and no transactions may be allowed.

The spatial computing IoT device may be associated with an entity computing system. The LiDAR analyzer may form a part of the spatial IoT computing device. The spatial computing IoT device may be configured to group the UJI into agglomerations based on an IP address of a last user transaction. The spatial computing IoT device may be configured to base the public key on the agglomerations.

The following figures and associated written specifications set forth the disclosure in additional detail to the foregoing.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The disclosure may be described in the context of computer-executable instructions, such as application(s) 119, being executed by a computer. Generally, programs include routines, programs, objects, components, data structures, etc., that perform particular tasks or implement particular data types. The disclosure may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The disclosure may be operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
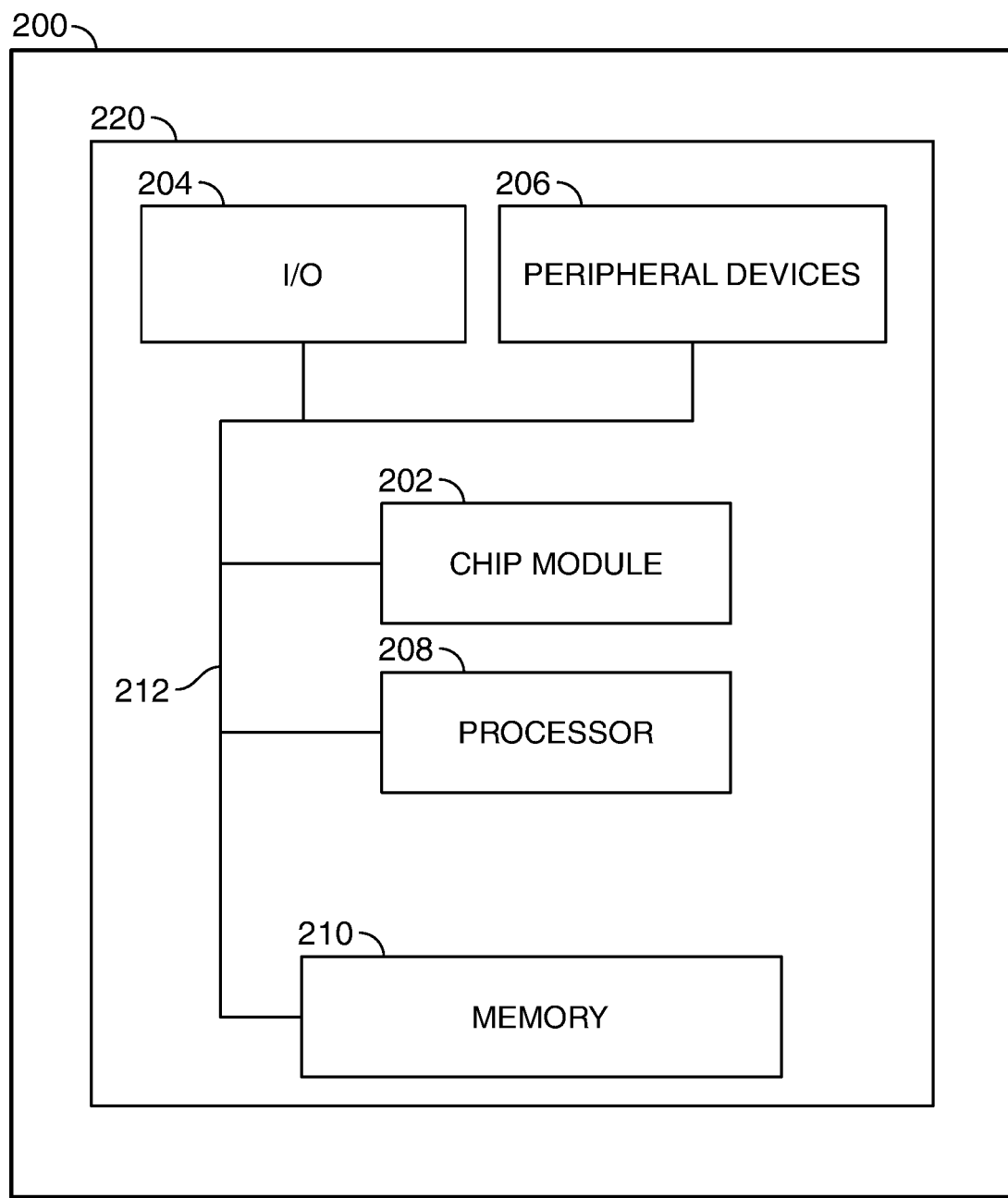
FIG. 2 shows an illustrative system in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
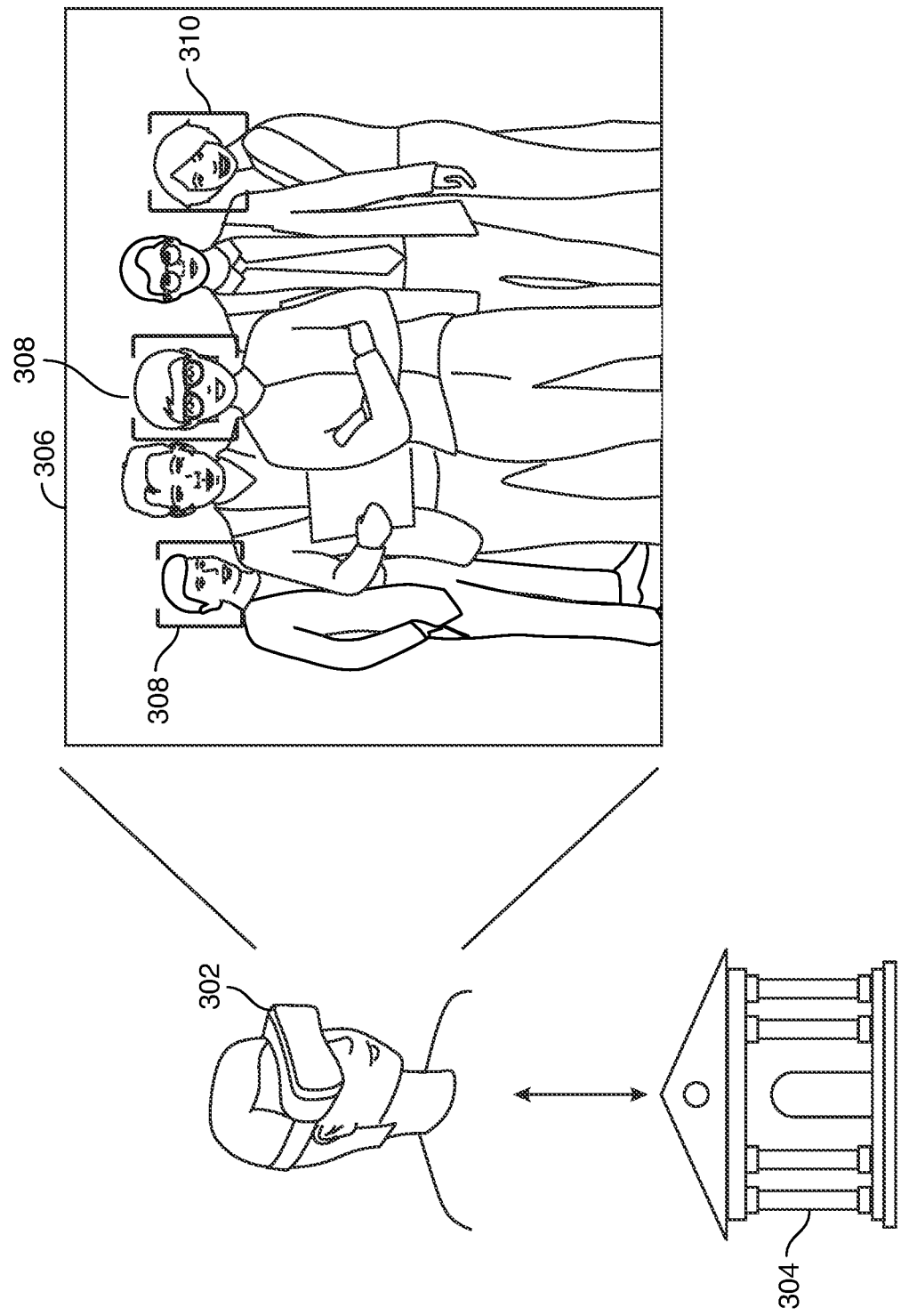
FIG. 3 shows a schematic diagram of a method and apparatus in accordance with principles of the disclosure.

FIG. 3 shows an exemplary illustration of the method and apparatus in accordance with the principles of the disclosure. A user may be equipped with a spatial computing IoT device 302. The spatial computing IoT device 302 may be in bidirectional communication with a financial institution 304.

The method and apparatus may enable a user to identify and select one or more faces during a spatial computing session. The method and apparatus may generate a transaction orchestration anchor for each identified face. Each transaction orchestration anchor may consist of facial biometric scans captured from images of faces in a map.

For example, the spatial computing IoT device 302 may use LiDaR to create a map 306 by mapping a surrounding environment. A transaction orchestration event anchor 308 may be created by the spatial IoT device 302. The transaction orchestration event anchor 308 may anchor identified faces in the map 306, identify the faces, and obtain UII associated with the faces.

A transaction orchestration event anchor 310 may anchor another identified face by the spatial computing IoT device 302. The transaction orchestration event anchor 310 may obtain different UII than transaction orchestration event anchor 308.

The method and apparatus may enable a spatial computing IoT device user to add users for transactions. The method and apparatus may orchestrate seamless inter- and intra-transactions by using trust-based passkeys linked to trust-based spatial anchors.

Inter-transactions may be transactions between a user associated with a spatial computing IoT device and other users. Intra-transactions may be transactions between other users. Both inter- and intra-transactions may be orchestrated by the spatial computing IoT device user.

Figure 4:
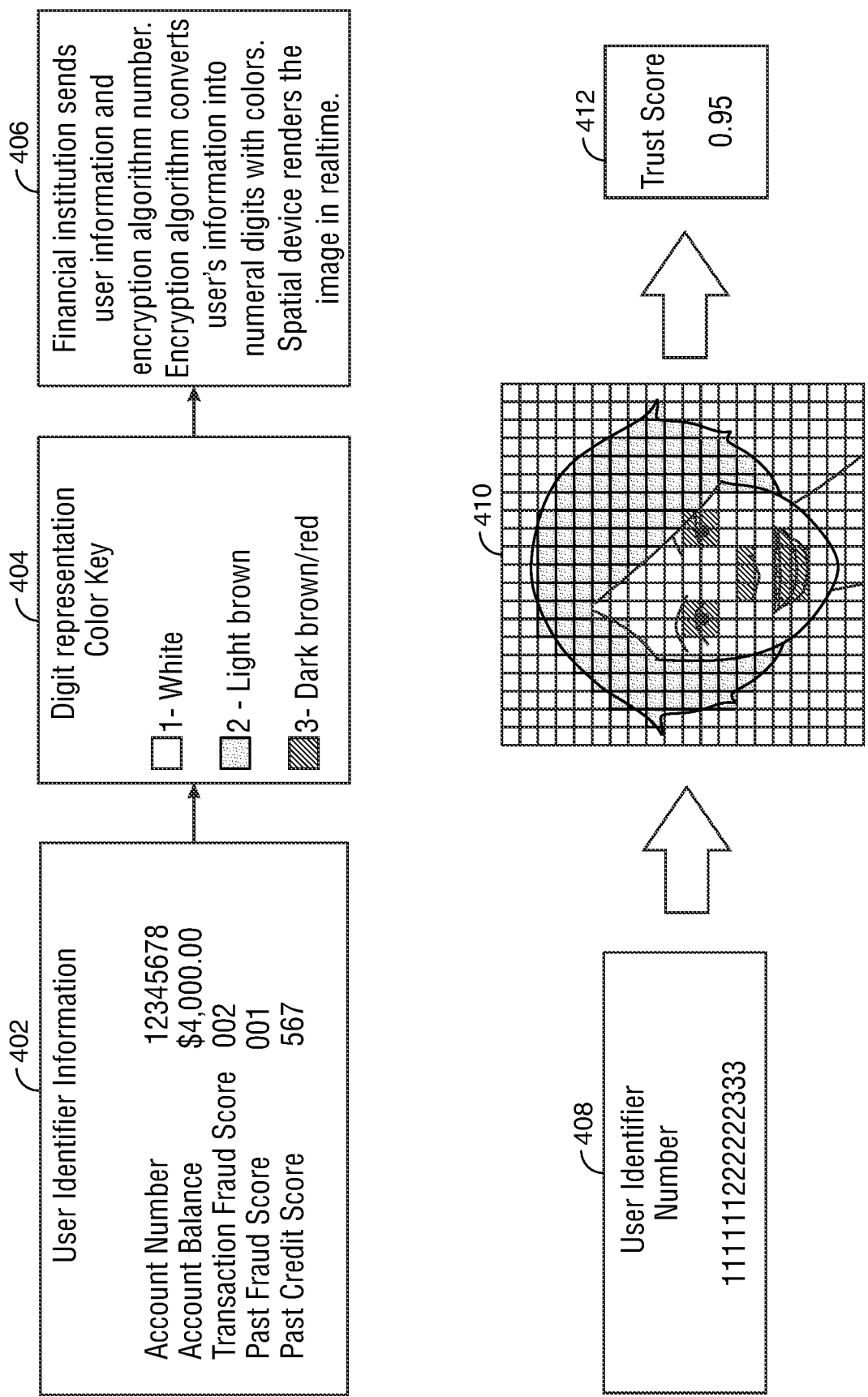
FIG. 4 shows a schematic diagram of a method and apparatus in accordance with principles of the disclosure.

FIG. 4 shows a schematic diagram of the method and apparatus in accordance with the principles of the disclosure. In particular, the schematic diagram illustrates a spatial IoT device calculating facial trust scores. The facial trust scores, and underlying data, may become a private key in a passkey for approving a transaction.

For example, a User's Identifier Information ("UII") 402 may be obtained from facial identification in a spatial IoT device mapping. The spatial IoT device may render an image of a face automatically. The spatial IoT device may collect data continuously.

The UJI may include account number (e.g., 1234557), account balance (e.g., $4000.00), past transaction fraud score (e.g., 002), past fraud score (e.g., 001), and past credit score (e.g., 567).

A User's UII may be represented by a User Identifier Number. The User Identifier Number 408 may be, for example, 1111111222222333.

A User's Identifier Digits may be represented as colors. Each digit of the User Identifier Number may correspond to a different color. A digit representation color key 404 may indicate how each digit in the User Identifier Number corresponds to different colors on a map. For example, 1 may correspond to white, 2 may correspond to light brown, 3 may correspond to dark brown or red, and so forth.

The User Identifier Number 408 may be converted into colors. The colors may be overlaid on top of a facial biometric map. Any identified face in the environment of a spatial IoT device may be mapped into a plurality of pixels. The User Identifier Number 408 may contain trust score information corresponding to colors over the map 410 from a spatial IoT device mapping. turn more into red pixel zones with a low score—this may represent a risky payment transaction.

Following the formation of a digital representation color key 404, the next step 406 may include sending encrypted information from a financial institution to the spatial IoT device. The financial institution may send account numbers, account balance, and other information to the spatial IoT device. The user's personal information (e.g., UII) may be encrypted into an encryption algorithm number. The encryption algorithm number may include encrypted UII. The encryption algorithm may contain the user's personal information converted into numeral digits corresponding to different colors.

Following the overlaying of colors on a facial biometric map 410, a trust score 412 may be obtained. A trust score may be obtained based on an algorithmic analysis of a user's past transactions, financial history, and current, dynamic transaction interactions. A trust score may be a number between 0 and 1, wherein 1 represents complete trust, and 0 represents no trust at all. A trust score threshold may be set at a reasonable number to allow for a high level of trust. For example, a trust score threshold of 0.9 may be set. In this case, a trust score 412 of 0.95 may be higher than the trust score threshold of 0.9. Therefore, in this case, a trust score of 0.95 (e.g., above 0.9) may represent a non-risky transaction.

Figure 5:
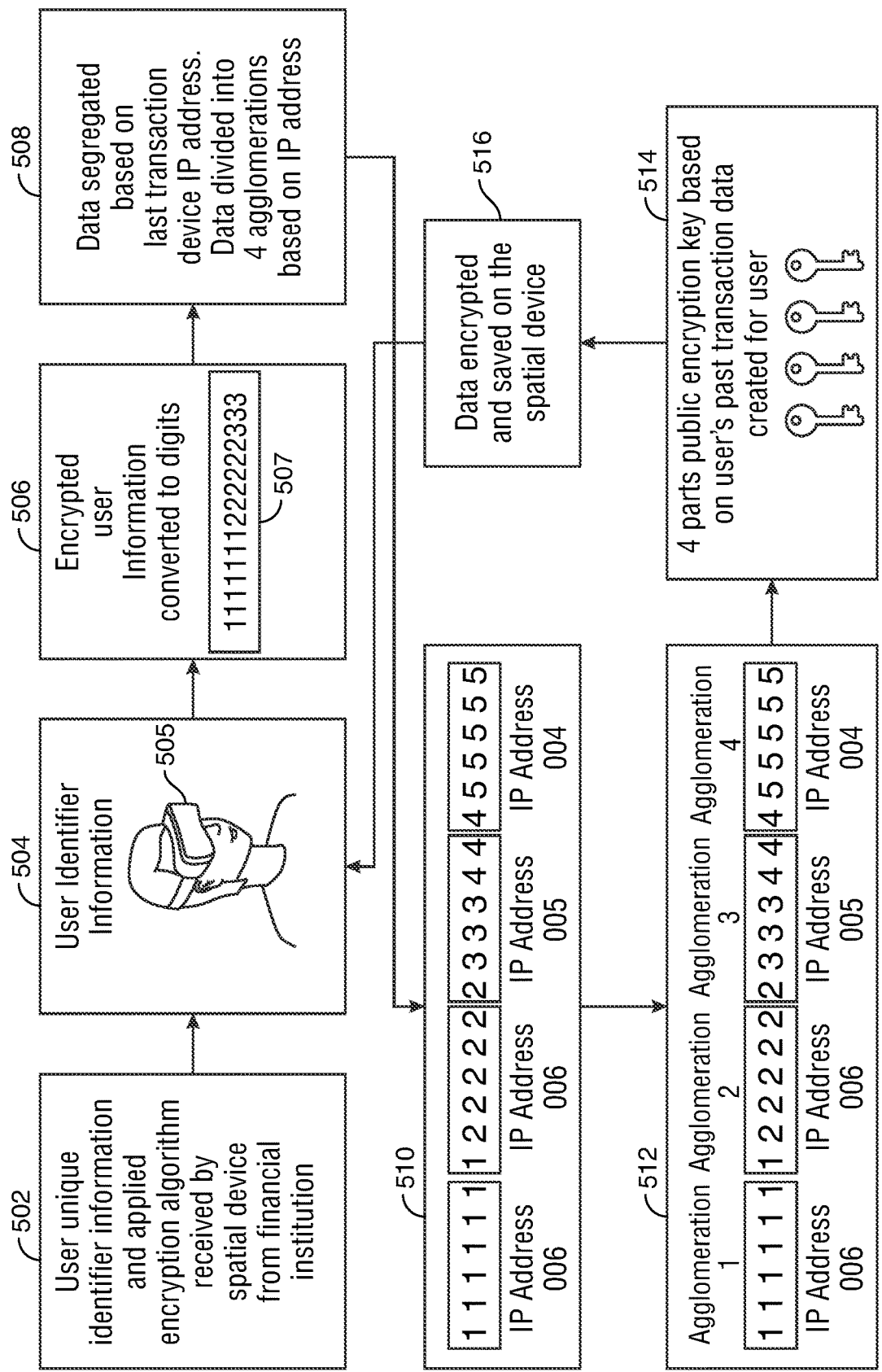
FIG. 5 shows a schematic diagram of a method and apparatus in accordance with principles of the disclosure.

FIG. 5 shows a schematic flow diagram of a method and apparatus in accordance with the principles of the disclosure. In particular, the schematic flow diagram illustrates how a user's UII may be converted into a public key of a passkey for a user transaction.

The method may include, and the apparatus may be configured to include the following step 502. Step 502 may be receiving, by a spatial IoT device, user identifier information and encryption algorithms from a financial institution.

The method may include, and the apparatus may be configured to include the following step 504. Step 504 may be storing User Identifier Information ("UII") within a spatial IoT device 505. The UII may be, e.g., Account Number 1234557, Account Balance—4000, Past Transaction Fraud Score—002, Past Fraud Score—001, Past Credit Score-567.

The method may include, and the apparatus may be configured to include the following step 506. Step 506 may be converting the encrypted UJI into digits. The UJI may be represented by a string of digits, e.g., 12345674000002001567. An encryption algorithm may be applied to the UJI received by the spatial IoT device and sent from the financial institution to create encrypted user information. Encrypted user information 507 may be represented by other digits, e.g., 1111111222222333.

The method may include, and the apparatus may be configured to include the following step 508. Step 508 may be segregating encrypted user data based on a last transaction device IP address. For example, encrypted user data may be divided into several agglomerations based on the device's IP address. In this example, 4 agglomerations are shown, however, any number of agglomerations may be used.

The method may include, and the apparatus may be configured to include the following step 510. Step 510 may be dividing the encrypted user data into parts based on IP addresses of devices used for previous transactions, e.g., 111111 IP Address 006, 122222 IP Address 006, 233344 IP Address 005, and 455555 IP Address 004.

The method may include, and the apparatus may be configured to include the following step 512. Step 512 may be dividing the encrypted user data into agglomerations. The agglomerations may be, e.g., Agglomeration 1-111111 IP Address 006, Agglomeration 2-122222 IP Address 006, Agglomeration 3-233344 IP Address 005, and Agglomeration 4-455555 IP Address 004.

The method may include, and the apparatus may be configured to include the following step 514. Step 514 may be converting the 4 agglomerations into 4 parts of a public encryption key. The public encryption key may be based on a user's past transaction data created for the user. The public encryption key may be made from a user's past transaction data.

The method may include, and the apparatus may be configured to include the following step 516. Step 516 may be encrypting user data and saving the encrypted user data on the spatial IoT device 505. The method and apparatus may be configured to be repeated continuously in a dynamically evolving fashion.

Figure 6:
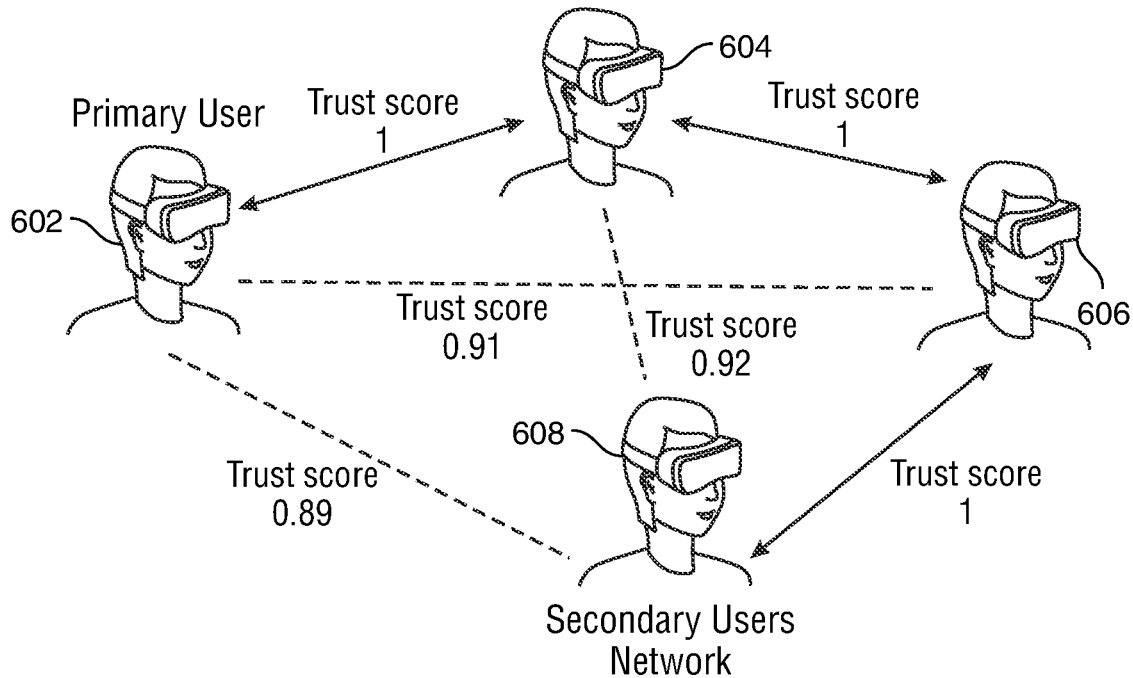
FIG. 6 shows a schematic diagram of a method and apparatus in accordance with principles of the disclosure.
Figure 6:
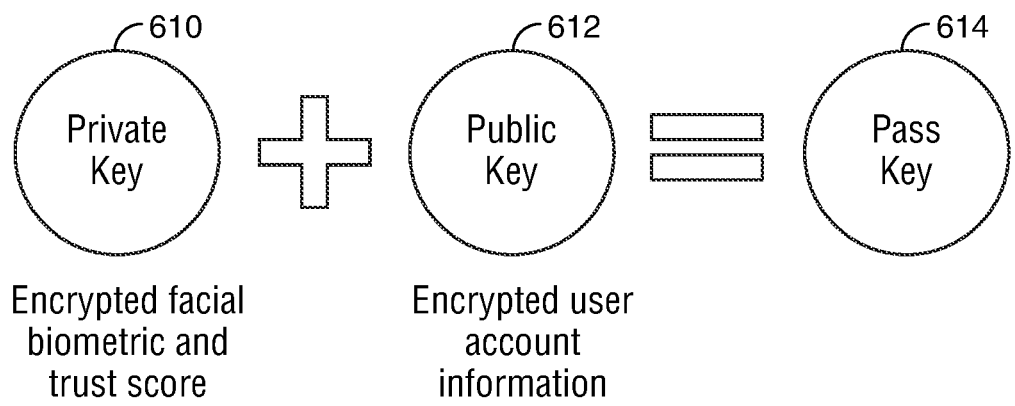

FIG. 6 shows a schematic flow diagram of a method and apparatus in accordance with the principles of the disclosure.

In particular, the schematic flow diagram illustrates procedures for using trust scores and passkeys.

A primary user 602 may wear a spatial IoT device. The primary user 602 may detect secondary users 604, 606, and 608 in a Secondary Users Network. Each secondary user may be wearing a spatial IoT device.

Here in this example, a trust score threshold may be set as 0.95. A trust score between primary user 602 and secondary user 604 may be a trust score of 1. Between secondary users 604 and 606 and 606 and 608 there also may be trust scores of 1. Transactions may be processed freely between primary user 602 and secondary user 604, secondary users 604 and 606, and secondary users 606 and 608 because the trust scores between those users is over 0.95.

A trust score between primary user 602 and secondary user 606, however, may be a trust score of 0.91. Between primary user 602 and secondary user 608 there may be a trust score of 0.89. And between secondary users 604 and 608 there may be a trust score of 0.92. Transactions may not be processed freely between primary user 602 and secondary user 606, primary user 602 and secondary user 608, and secondary users 604 and 608 because the trust scores between those users is less than or equal to 0.95. Additional authorization may be required to enable transactions between users with trust scores below or equal to a threshold value.

The method and apparatus may be configured to utilize a transitive relationship to enable a primary user to trust secondary users leveraging a passkey 614. The passkey 614 may include a private key 610 (e.g., an encrypted facial biometric and a trust score) and a public key 612 (e.g., encrypted user account information).

Figure 7:
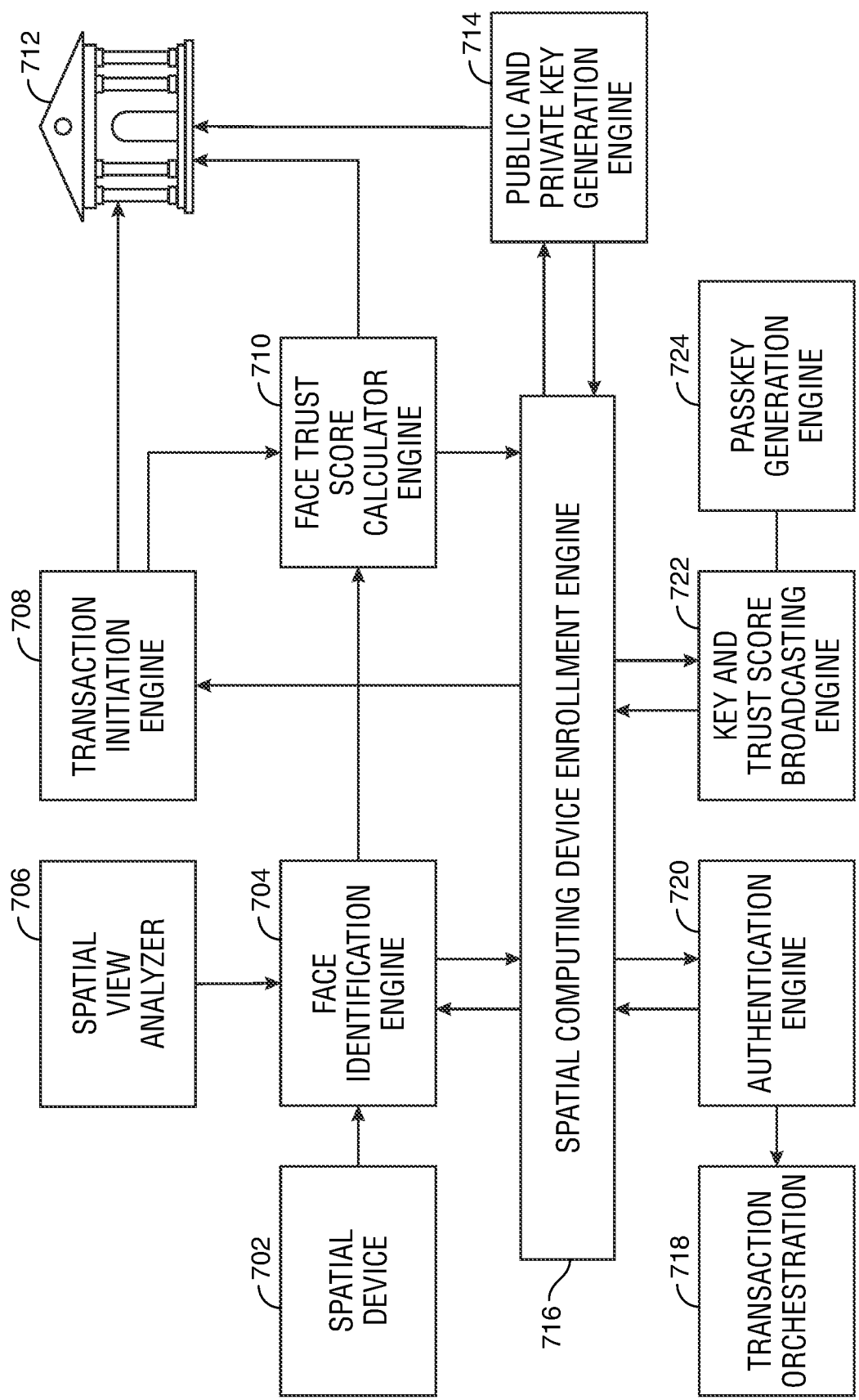
FIG. 7 shows an illustrative flow chart diagram in accordance with principles of the disclosure.

FIG. 7 shows an illustrative flow chart diagram in accordance with principles of the disclosure. A spatial IoT device 702 may be used to identify people, users, and faces for payment and other transactions.

A face identification engine 704 may be used to provide facial attribute information. A spatial view analyzer 706 may be used to make a spatial view of a surrounding environment. A spatial computing device enrollment engine 716 may be used to enroll data obtained from spatial computing devices and financial institutions for transactions.

A transaction initiation engine 708 may be used to integrate with a financial institution 712 for private and public key information fetching. The transaction initiation engine may also be used to provide user account and past credit information. A face trust score calculator engine 710 may be used to provide trust scores to the spatial computing device enrollment engine 716.

A public and private key generation engine 714 may be used to generate public and private keys. Resources may be exchanged between the spatial computing device enrollment engine 716 and the public and private key generation engine 714. The public and private key generation engine 714 may also be used to reverify information with the financial institution 712.

A passkey generation engine 724 may be used to generate a passkey from the public and private keys. Passkeys may be used to enable transactions between primary users and secondary and between secondary users. A key and trust score broadcasting engine 722 may be used to broadcast trust score information to users in a spatial session via the spatial computing device enrollment engine 716.

An authentication engine 720 may be used to verify each user prior to final transaction approval. The authentication engine 720 may exchange information with the spatial computing device enrolment engine 716. A transaction orchestration 718 may be used to provide final approval for each transaction.

The steps of apparatus and methods may be performed in orders beyond the order shown and/or described herein. Embodiments may omit steps shown and/or described in connection with illustrative methods. Embodiments may include steps that are neither shown nor described in connection with illustrative methods.

Illustrative apparatus and methods steps may be combined. For example, an illustrative method may include steps shown in connection with another illustrative method.

Apparatus and methods may omit features shown and/or described in connection with illustrative apparatus and methods. Embodiments may include features that are neither shown nor described in connection with the illustrative apparatus and methods. Features of illustrative apparatus and methods may be combined. For example, an illustrative embodiment may include features shown in connection with another illustrative embodiment.

The drawings show illustrative features of apparatus and methods in accordance with the principles of the disclosure. The features are illustrated in the context of selected embodiments. It will be understood that features shown in connection with one of the embodiments may be practiced in accordance with the principles of the disclosure along with features shown in connection with another of the embodiments.

One of ordinary skill in the art will appreciate that the steps shown and described herein may be performed in other ways and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, intelligent apparatus and methods to orchestrate transactions on spatial computing IoT devices based on facial trust anchors and passkeys are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for processing and executing transactions using a spatial computing Internet-of-Things ("IoT") device, the method comprising:

generating a map from mapping, using a light detection and ranging ("LiDAR") analyzer, an environment surrounding a spatial computing IoT device;

scanning the map by using a facial biometric scanner, the facial biometric scanner being a part of the spatial computing IoT device;

identifying, from the scanning, an image of a face included in the map;

retrieving, from the scanning, user identifier information ("UII") of the identified face;

dividing the image of the identified face into a plurality of pixels;

storing the UII in the plurality of pixels, one discrete bit of the UII stored in each pixel;

encrypting the UII into an encrypted UII algorithm, the encrypted UII algorithm stored as a public key;

transmitting, via an institution integration module located in the spatial computing IoT device, the public key to an entity computing system;

decoding, at the spatial computing IoT device, the public key into a plurality of numbers, each number in the plurality of numbers corresponding to a color included in a plurality of colors;

arranging each color over a discrete one of the plurality of pixels;

overlaying each color over each discrete pixel;

encrypting the overlayed colors into an encrypted facial biometric algorithm, the encrypted facial biometric algorithm stored as a private key;

converting the private key into a user trust score, the user trust score corresponding to the identified face;

verifying, by a threshold trust score, an authenticity of a user associated with the identified face, said verifying being based upon the user trust score; and executing a transaction requested by a user associated with the spatial computing IoT device, said transaction associated with a user associated with the identified face, said executing using the private key and the public key as a dynamic passkey for the transaction.

2. The method of claim 1 further comprising:
identifying, from the scanning, images of a plurality of faces included in the map;
retrieving, from the scanning, UII for each of the plurality of identified faces;
dividing the images of the plurality of identified faces into a plurality of pixels;
storing the UII in the pixels, one discrete bit of the UII stored in each pixel;
encrypting the UII into encrypted UII algorithms, the encrypted UII algorithms stored as public keys;
transmitting, via an institution integration module located in the spatial computing IoT device, the public keys to an entity computing system;
decoding, at the spatial computing IoT device, the public keys into a plurality of numbers, each number in the plurality of numbers corresponding to a color included in a plurality of colors;
arranging each color over a discrete one of the plurality of pixels;
overlaying each color over each discrete pixel;
encrypting the overlayed colors into encrypted facial biometric algorithms, the encrypted facial biometric algorithms stored as private keys;
converting the private keys into user trust scores, the user trust scores corresponding to the plurality of identified faces;
verifying, by a threshold trust score, the authenticities of users associated with the plurality of identified faces, said verifying being based upon the user trust scores; and
executing transactions requested by a user associated with the spatial computing IoT device, said transactions associated with a plurality of users associated with the plurality of identified faces, said executing by using the private keys and the public keys as dynamic passkeys for the transactions.

3. The method of claim 2 wherein the threshold trust score is 0.9.

4. The method of claim 2 wherein the spatial computing IoT device is associated with the entity computing system.

5. The method of claim 2 wherein the LiDAR analyzer forms a part of the spatial IoT computing device.

6. The method of claim 2 wherein:
grouping the UII into agglomerations based on an IP addresses of last user transactions; and
basing the public key on the agglomerations.

7. The method of claim 1 wherein the threshold trust score is 0.9.

8. The method of claim 1 wherein the spatial computing IoT device is associated with the entity computing system.

9. The method of claim 1 wherein the LiDAR analyzer forms a part of the spatial IoT computing device.

10. The method of claim 1 further comprising:
grouping the UII into agglomerations based on an IP address of a last user transaction; and
basing the public key on the agglomerations.

11. Apparatus for processing and executing a user transaction, the apparatus comprising:
a spatial computing Internet-of-Things ("IoT") device;
a light detection and ranging ("LiDAR") analyzer, said LiDAR analyzer configured to generate a map from mapping an environment surrounding the spatial computing IoT device; and
the spatial computing IoT device configured to:
scan the map by using a facial biometric scanner, the facial biometric scanner being a part of the spatial computing IoT device;
identify, from the scan, an image of a face included in the map;
retrieve, from the scan, user identifier information ("UII") of the identified face;
divide the image of the identified face into a plurality of pixels;
store the UII in the pixels, one discrete bit of the UII stored in each pixel;
encrypt the UII into an encrypted UII algorithm, the encrypted UII algorithm stored as a public key;
transmit, via an institution integration module located in the spatial computing IoT device, the public key to an entity computing system;
decode, at the spatial computing IoT device, the public key into a plurality of numbers, each number in the plurality of numbers corresponding to a color included in a plurality of colors;
arrange each color over a discrete one of the plurality of pixels;
overlay each color over each discrete pixel;
encrypt the overlayed colors into an encrypted facial biometric algorithm, the encrypted facial biometric algorithm stored as a private key;
convert the private key into a trust score, the trust score corresponding to the identified face;
verify, by a threshold trust score, an authenticity of a user associated with the identified face, said verifying being based upon the trust score of the user; and
execute a transaction requested by a user associated with the spatial computing IoT device, said transaction associated with a user associated with the identified face, said executing by using the private key and the public key as a dynamic passkey for the transaction.

12. The apparatus of claim 11, the spatial computing IoT device further configured to:
identify, from the scanning, images of a plurality of faces included in the map;
retrieve, from the scanning, UII of the plurality of identified faces;
divide the images of the plurality of identified faces into a plurality of pixels;

store the UII in the pixels, one discrete bit of the UII stored in each pixel;

encrypt the UII into encrypted UII algorithms, the encrypted UII algorithms stored as public keys;

transmit, via an institution integration module located in the spatial computing IoT device, the public keys to an entity computing system;

decode, at the spatial computing IoT device, the public keys into a plurality of numbers, each number in the plurality of the numbers corresponding to a color included in a plurality of colors;

arrange each color over a discrete one of the plurality of pixels;

overlay each color over each discrete pixel;

encrypt the overlayed colors into encrypted facial biometric algorithms, the encrypted facial biometric algorithms stored as private keys;

convert the private keys into user trust scores, the user trust scores corresponding to the plurality of identified faces;

verify, by a threshold trust score, the authenticities of users associated with the plurality of identified faces, said verifying being based upon the user trust scores; and execute, transactions requested by a user associated with the spatial computing IoT device, said transactions associated with a plurality of users associated with the plurality of identified faces, said executing by using the private keys and the public keys as dynamic passkeys for the transactions.

13. The apparatus of claim 12 wherein the spatial computing IoT device is further configured with a threshold trust score of 0.9.

14. The apparatus of claim 12 wherein the spatial computing IoT device is associated with the entity computing system.

15. The apparatus of claim 12 wherein the LiDAR analyzer forms a part of the spatial IoT computing device.

16. The apparatus of claim 12 wherein the spatial computing IoT device is further configured to:
   group the UII into agglomerations based on IP addresses of last user transactions; and
   base the public keys on the agglomerations.

17. The apparatus of claim 11 wherein the spatial computing IoT device is further configured with a threshold trust score of 0.9.

18. The apparatus of claim 11 wherein the spatial computing IoT device is associated with the entity computing system.

19. The apparatus of claim 11 wherein the LiDAR analyzer forms a part of the spatial IoT computing device.

20. The apparatus of claim 11 wherein the spatial computing IoT device is further configured to:
   group the UII into agglomerations based on an IP address of a last user transaction; and
   base the public key on the agglomerations.

* * * * *